July 30, 1968  S. E. SLATTERY  3,394,543
GAS TURBINE ENGINE WITH MEANS TO ACCUMULATE
COMPRESSED AIR FOR AUXILIARY USE
Filed March 30, 1967
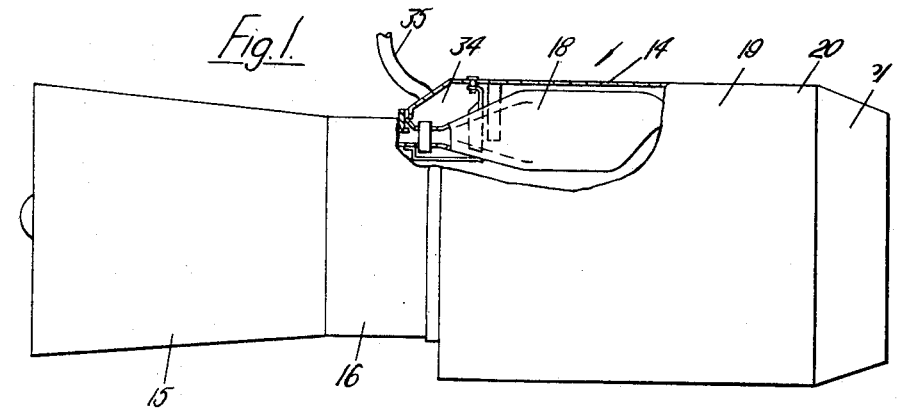
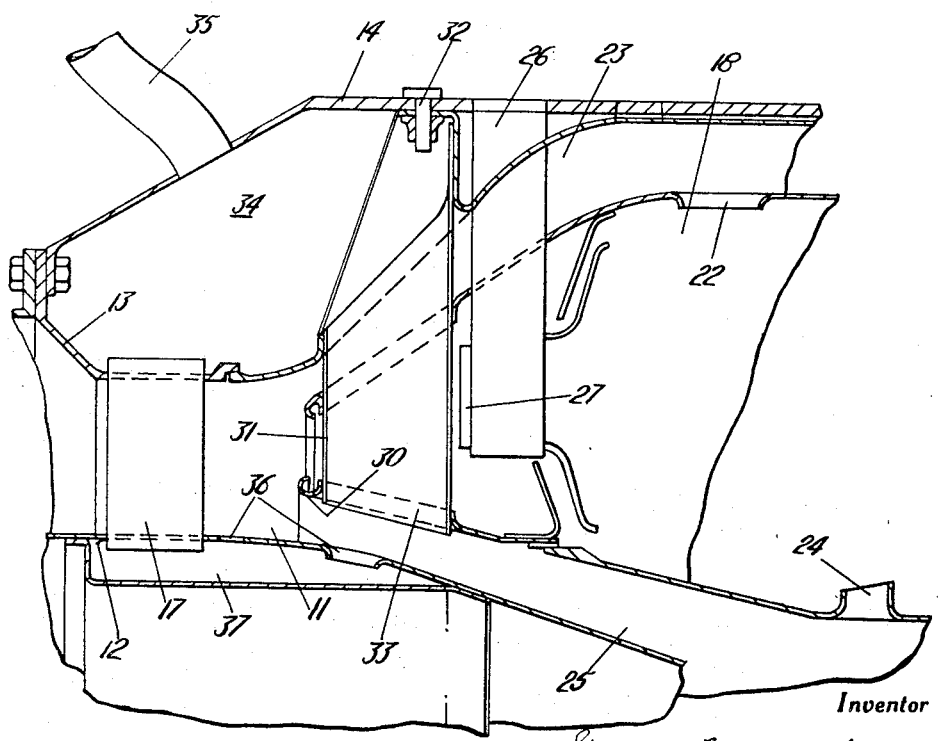
Inventor
Sidney Edward Slattery
By
Cushman, Darby & Cushman
Attorneys

3,394,543
GAS TURBINE ENGINE WITH MEANS TO ACCUMULATE COMPRESSED AIR FOR AUXILIARY USE

Sidney Edward Slattery, Derby, England, assignor to Rolls-Royce Limited, Derby, England, a British company
Filed Mar. 30, 1967, Ser. No. 627,231
Claims priority, application Great Britain, Apr. 29, 1966, 19,051/66
5 Claims. (Cl. 60—39.07)

ABSTRACT OF THE DISCLOSURE

Hollow struts are provided downstream of the high pressure compressor and upstream of the fuel injectors of a gas turbine engine. The hollow struts extend across the annular flow duct and have inner ends which receive compressed air flowing over the inner wall of the flow duct, conduits pass this air externally of the engine for ancillary purposes.

---

This invention concerns a gas turbine engine.

According to the present invention, there is provided a gas turbine engine having an annular flow duct within which a low pressure compressor, a high pressure compressor, combustion equipment, a high pressure turbine and a low pressure turbine are mounted in flow series, fuel injectors for injecting fuel into the combustion equipment, a plurality of angularly spaced apart, radially extending, hollow struts which are disposed downstream of the high pressure compressor and upstream of the fuel injectors, the hollow struts extending into the annular flow duct and having inner ends which are disposed adjacent to the inner wall of the annular flow duct so as to receive compressed air flowing over the inner wall, and conduit means for passing to a point externally of the engine compressed air which flows radially outwardly through the hollow struts.

The combustion equipment preferably comprises an annular flame tube whose upstream end is located by the hollow struts, the inner ends of the hollow struts communicating with a space between the inner wall of the flame tube and the inner wall of the annular flow duct. The hollow struts preferably pass through and are secured to the upstream end of the flame tube and are radially slidable on studs secured to the engine casing.

The radially outer ends of the struts may communicate with an annular manifold surrounding the annular flow duct, the annular manifold communicating with an outlet conduit which extends externally of the engine.

The invention also comprises an aircraft provided with a gas turbine engine as set forth above, the air supplied to the conduit means being used for cabin pressurisation.

The invention is illustrated, merely by way of example, in the accompanying drawings, in which:

FIGURE 1 is a diagrammatic view partly in section, of a gas turbine engine according to the present invention, and FIGURE 2 is a broken-away sectional view showing part of the structure of FIGURE 1 on a larger scale.

Referring to the drawings, a gas turbine engine 10 has an annular flow duct 11 (FIGURE 2) which is defined between inner and outer walls 12, 13, part of the outer wall 13 being mounted within an engine casing 14. Mounted in flow series in the annular flow duct 11 are a low pressure compressor 15, a high pressure compressor 16, a plurality of angularly spaced apart hollow outlet guide vanes 17, combustion equipment which includes an annular flame tube 18, a high pressure turbine 19, and a low pressure turbine 20, the turbine exhaust gases being directed to atmosphere through a short exhaust duct 21.

The annular flame tube 18 is spaced from the outer wall 13 of the annular flow duct 11 by an annular space 23 through which may pass air from the compressors 15, 16. Air from the annular space 23 is used as "secondary" air, i.e. for completing the combustion in the primary zone of the annular flame tube 18, this "secondary" air entering the annular flame tube 18 through a plurality of angularly spaced apart holes 22. The air flowing through the annular space 23 also cools the outer wall of the annular flame tube 18.

The annular flame tube 18 is spaced from the inner wall 12 of the annular flow duct 11 by an annular space 25 through which may flow air from the compressors 15, 16, this air both effecting cooling of the inner wall of the annular flame tube 18 and also being employed as dilution air, i.e. for diluting the combustion gases to a temperature acceptable to the turbines 19, 20, this dilution air entering the annular flame tube 18 through a plurality of angularly spaced apart dilution air holes 24.

Fuel for combustion in the annular flame tube 18 is supplied through a conduit 26 leading to fuel injectors 27.

The upstream end 30 of the annular flame tube 18 is located in position by means of a plurality of angularly spaced apart radially extending hollow struts 31. The hollow struts 31 pass through and are welded to the upstream end 30 of the annular flame tube 18, the radially outer ends of the hollow struts 31 being radially slidable on studs 32 which are secured to the engine casing 14. Thus, the upstream end of the flame tube 18 may move radially with respect to the engine casing 14, so as to cater for relative radial expansion, but is located axially.

The radially inner ends 33 of the hollow struts 31 are open and communicate with the annular space 25 so as to receive compressed air which flows over the inner wall 12 from the high pressure compressor 16.

The radially outer ends of the hollow struts 31 are open and communicate with an annular manifold 34 which surrounds the annular flow duct 11 and is disposed immediately downstream of the high pressure compressor 16. The annular manifold 34 communicates with an outlet conduit 35 which extends externally of the engine 10 and through which the compressed air may be withdrawn for use in cabin pressurisation of an aircraft within which the engine 10 is mounted.

The inner wall 12 is provided with apertures 36 which communicate with an annular chamber 37 which is disposed internally of the inner wall. The radially inner ends of the hollow outlet guide vanes 17 communicate with the chamber 37 so as to receive therefrom air which had been flowing over the inner wall 12, while their radially outer ends communicate with the annular manifold 34 so as to supply this air thereto.

By reason of the disposition of the hollow outlet guide vanes 17 and hollow struts 31, which are downstream of the high pressure compressor 16 but upstream of the fuel injectors 27, there is little risk of the air flowing to the outlet conduit 35 being contaminated by fuel. This air, moreover, will be adequately pressurised by reason of being compressed by the high pressure compressor 16, and will also be drawn from the radially inner part of the annular flow duct 11 and will therefore be substantially free of dust.

The cross-sections of the hollow struts 31 may, moreover, readily be made such as to provide ample space for the passage of adequate air for such cabin pressurisation.

In our prior British patent specification No. 932,000, we have disclosed and claimed a gas turbine engine including compressor means which so compresses air flowing through a main annular fluid duct of the engine that dust carried in the air tends to concentrate in the part of the air flowing adjacent the radially outer wall of the duct, said compressor means being provided with at least one hollow compressor outlet guide vane whose interior communicates with the duct solely through one or more passages located in the radially inner wall of the duct downstream of said vane, the latter serving to conduct relatively dust-free compressed air from the duct to the exterior of the engine for ancillary purposes.

We claim:

1. A gas turbine engine having, an annular flow duct, a low pressure compressor, a high pressure compressor, combustion equipment, a high pressure turbine and a low pressure turbine mounted in flow series within said annular flow duct, fuel injectors for injecting fuel into the combustion equipment, a plurality of angularly spaced apart, radially extending, hollow struts which are disposed downstream of the high pressure compressor and upstream of the fuel injectors, the hollow struts extending into the annular flow duct, the inner wall of the annular flow duct having the inner ends of said hollow struts adjacent thereto so that the hollow struts receive compressed air flowing over the inner wall, and conduit means for passing to a point externally of the engine compressed air which flows radially outwardly through the hollow struts.

2. A gas turbine engine as claimed in claim 1 in which an annular flame tube, whose upstream end is located by the hollow struts, forms part of the combustion equipment, the inner ends of the hollow struts communicating with a space between the inner wall of the flame tube and the inner wall of the annular flow duct.

3. A gas turbine engine as claimed in claim 2 in which the hollow struts pass through and are secured to the upstream end of the flame tube, studs being secured to the engine casing on which said hollow struts are radially slidable.

4. A gas turbine engine as claimed in claim 1 in which an annular manifold surrounds the annular flow duct and with which the radially outer ends of the struts communicate, the annular manifold communicating with an outlet conduit which extends externally of the engine.

5. A gas turbine engine as claimed in claim 4 in which hollow outlet guide vanes are mounted in the annular flow duct between the high pressure compressor and the hollow struts, the radially outer ends of the hollow outlet guide vanes communicating with said annular manifold, and the radially inner ends of the hollow outlet guide vanes communicating with a radially inner part of the annular flow duct to receive air therefrom.

No references cited.

JULIUS E. WEST, *Primary Examiner.*